United States Patent
Whitacre (10) Patent No.: US 8,945,751 B2
(45) Date of Patent: Feb. 3, 2015

(54) HIGH VOLTAGE BATTERY COMPOSED OF ANODE LIMITED ELECTROCHEMICAL CELLS

(75) Inventor: Jay Whitacre, Pittsburgh, PA (US)

(73) Assignee: Aquion Energy, Inc., Pittsburgh, PA (US)

(*) Notice: Subject to any disclaimer, the term of this patent is extended or adjusted under 35 U.S.C. 154(b) by 0 days.

(21) Appl. No.: 13/423,430

(22) Filed: Mar. 19, 2012

(65) Prior Publication Data

US 2013/0020999 A1 Jan. 24, 2013

Related U.S. Application Data

(63) Continuation-in-part of application No. 13/186,226, filed on Jul. 19, 2011, now Pat. No. 8,137,830.

(51) Int. Cl.
| | |
|---|---|
| *H01M 4/505* | (2010.01) |
| *H01M 4/587* | (2010.01) |
| *H01M 6/04* | (2006.01) |
| *H01M 12/00* | (2006.01) |
| *H01M 14/00* | (2006.01) |
| *H02J 7/00* | (2006.01) |

(52) U.S. Cl.
CPC ............. *H01M 14/00* (2013.01); *H02J 7/00* (2013.01); *Y02E 60/122* (2013.01); *Y02E 70/20* (2013.01)
USPC ............ 429/122; 429/231.8; 429/231.9; 429/347; 320/118

(58) Field of Classification Search
USPC ............ 429/50, 122, 231.8, 231.9, 347
See application file for complete search history.

(56) References Cited

U.S. PATENT DOCUMENTS

| | | | |
|---|---|---|---|
| 4,246,253 | A | 1/1981 | Hunter |
| 5,316,877 | A | 5/1994 | Thackeray et al. |
| 5,424,145 | A | 6/1995 | Tomantschger et al. |
| 5,525,442 | A | 6/1996 | Shuster |
| 5,558,961 | A | 9/1996 | Doeff et al. |
| 5,958,624 | A | 9/1999 | Frech et al. |
| 5,963,417 | A | 10/1999 | Anderson et al. |
| 6,017,654 | A | 1/2000 | Kumta et al. |
| 6,040,089 | A | 3/2000 | Manev et al. |
| 6,159,637 | A | 12/2000 | Shizuka et al. |
| 6,248,477 | B1 | 6/2001 | Howard, Jr. et al. |
| 6,267,943 | B1 | 7/2001 | Manev et al. |

(Continued)

FOREIGN PATENT DOCUMENTS

| | | |
|---|---|---|
| CN | 1112737 A | 11/1995 |
| CN | 1674347 A | 9/2005 |

(Continued)

OTHER PUBLICATIONS

"Transition metal," http://en.wikipedia.org/wiki/Transition_metal, accessed: Jul. 31, 2013.*

(Continued)

*Primary Examiner* — Sean P Cullen
(74) *Attorney, Agent, or Firm* — The Marbury Law Group PLLC (57) ABSTRACT

An electrochemical storage device including a plurality of electrochemical cells connected electrically in series. Each cell includes an anode electrode, a cathode electrode and an aqueous electrolyte. The charge storage capacity of the anode electrode is less than the charge storage capacity of the cathode.

1 Claim, 9 Drawing Sheets

(56) References Cited

U.S. PATENT DOCUMENTS

| | | | |
|---|---|---|---|
| 6,322,744 B1 | 11/2001 | Kelley et al. |
| 6,325,988 B1 | 12/2001 | Inoue et al. |
| 6,383,683 B1 | 5/2002 | Nagayama et al. |
| 6,403,253 B1 | 6/2002 | Wainwright et al. |
| 6,413,673 B1 | 7/2002 | Kasai et al. |
| 6,423,294 B2 | 7/2002 | Manev et al. |
| 6,465,129 B1 | 10/2002 | Xu et al. |
| 6,465,130 B1 | 10/2002 | Numata et al. |
| 6,531,220 B1 | 3/2003 | Kweon et al. |
| 6,599,662 B1 | 7/2003 | Chiang et al. |
| 6,670,076 B1 | 12/2003 | Iwata et al. |
| 6,673,491 B2 | 1/2004 | Shirakawa et al. |
| 6,692,665 B2 | 2/2004 | Shima et al. |
| 6,787,232 B1 | 9/2004 | Chiang et al. |
| 6,814,894 B2 | 11/2004 | Shoji et al. |
| 6,869,547 B2 | 3/2005 | Barker et al. |
| 6,872,492 B2 | 3/2005 | Barker et al. |
| 7,008,726 B2 | 3/2006 | Adamson et al. |
| 7,041,239 B2 | 5/2006 | Barker et al. |
| 7,056,486 B2 | 6/2006 | Park et al. |
| 7,087,346 B2 | 8/2006 | Barker et al. |
| 7,199,997 B1 | 4/2007 | Lipka et al. |
| 7,214,448 B2 | 5/2007 | Barker et al. |
| 7,335,444 B2 | 2/2008 | Numata et al. |
| 2002/0009645 A1 | 1/2002 | Shima et al. |
| 2002/0048706 A1 | 4/2002 | Mayes et al. |
| 2002/0182502 A1 | 12/2002 | Park et al. |
| 2003/0035999 A1 | 2/2003 | Gao et al. |
| 2003/0186128 A1 | 10/2003 | Singh et al. |
| 2003/0190528 A1 | 10/2003 | Saidi et al. |
| 2004/0191627 A1 | 9/2004 | Takahashi et al. |
| 2004/0262571 A1 | 12/2004 | Barker et al. |
| 2005/0181280 A1 | 8/2005 | Ceder et al. |
| 2005/0181283 A1 | 8/2005 | Pugh et al. |
| 2005/0238961 A1 | 10/2005 | Barker et al. |
| 2006/0019166 A1 | 1/2006 | Numata et al. |
| 2006/0035151 A1 | 2/2006 | Kumeuchi et al. |
| 2006/0154071 A1 | 7/2006 | Homma et al. |
| 2006/0263688 A1 | 11/2006 | Guyomard et al. |
| 2007/0072034 A1 | 3/2007 | Barker et al. |
| 2008/0008937 A1 | 1/2008 | Eylem et al. |
| 2008/0158778 A1 | 7/2008 | Lipka et al. |
| 2009/0053613 A1 | 2/2009 | Inoue et al. |
| 2009/0253025 A1 | 10/2009 | Whitacre |
| 2011/0052945 A1 | 3/2011 | Whitacre |

FOREIGN PATENT DOCUMENTS

| | | |
|---|---|---|
| CN | 101154745 A | 4/2008 |
| CN | 102027625 A | 4/2011 |
| JP | 2000-331682 A | 11/2000 |
| JP | 10-2001-0024357 A | 3/2001 |
| JP | 2003-086179 A | 3/2003 |
| JP | 10-2007-0100918 A | 10/2007 |
| WO | WO 2006/111079 A1 | 10/2006 |

OTHER PUBLICATIONS

B.L. Ellis et al., "A Multifunctional 3.5 V Iron-based Phosphate Cathode for Rechargeable Batteries," Nature Materials, vol. 6, Oct. 2007.

J.M. Tarascon et al., "Chemical and Electrochemical Insertion of Na into the Spinel λ-$MnO_2$ Phase," Solid State Ionics 57 (1992), 113-120.

Wang et al., "Hybrid Aqueous Energy Storage Cells Using Activated Carbon and Lithium-Intercalated Compounds," Journal of the Electrochemical Society, 153 (2) A450-A454 (2006).

International Search Report & Written Opinion issued in PCT Application No. PCT/US12/46995, mailed on Jan. 31, 2013.

U.S. Appl. No. 13/043,787, filed Mar. 9, 2011, Applicant: Jay Whitacre.

Akimoto et al., "Synthesis and Electrochemical Properties of $Li_{0.44}MnO_2$ as a Novel 4 V Cathode Material," Electrochemical and Solid-State Letters, 2005, 8(10):A554-A557.

Alcantara et al., "Carbon Microspheres Obtained from Resorcinol-Formaldehyde as High-Capacity Electrodes for Sodium-Ion Batteries," Electrochemical and Solid-State Letters, 2005, 8(4):A222-A225.

Alcantara et al., "$NiC_{o2}O_4$ Spinel: First Report on a Transition Metal Oxide for the Negative Electrode of Sodium-Ion Batteries," Chem. Mater., 2002, 14:2847-2848.

Athouel et al., "Birnessite as Possible Candidate for Hybrid Carbon/$MnO_2$ Electrochemical Capacitor," Abstract from 214th ECS Meeting, Honolulu, HI, Oct. 12-17, 2008.

Bordet-Le Geunne et al., "Structural study of two layered phases in the $Na_xMn_yO_2$ system. Electrochemical behavior of their lithium substituted derivatives," J. Mater. Chem., 2000, 10:2201-2206.

Brousse et al., "A Hybrid Activated Carbon-Manganese Dioxide Capacitor using a Mild Aqueous Electrolyte," Journal of the Electrochemical Society, 2004, 151(4):A614-A622.

Brousse et al., "Crystalline $MnO_2$ as Possible Alternatives to Amorphous Compounds in Electrochemical Supercapacitors," Journal of Electrochemical Society, 2006: 153, A2171-A2080.

Cvjeticanin et al., "Cyclic voltammetry of $LiC_{r0.15}Mn_{1.85}O_4$ in an aqueous $LiNO_3$ solution," Journal of Power Sources, 2007, 174:1117-1120.

Doeff et al., "A High-Rate Manganese Oxide for Rechargeable Lithium Battery Applications," Journal of the Electrochemical Society, 2001, 148(3):A230-A236.

Doeff et al., "Electrochemical and structural characterization of titanium-substituted manganese oxides based on $Na_{0.44}MnO_2$," Journal of Power Sources, 2004, 125:240-248.

Doeff et al., "Lithium Insertion Processes of Orthorhombic $Na_xMnO_2$-Based Electrode Materials," J. Electrochem. Soc., Aug. 1996, 143(8):2507-2516.

Doeff et al., "Synthesis and characterization of a copper-substituted manganese oxide with the $Na_{0.44}MnO_2$ structure," Journal of Power Sources, 20002, 112:294-297.

Doeff et al., "Orthorhomic $Na_xMnO_2$ as a Cathode Material for Secondary Sodium and Lithium Polymer Batteries," J. Electrochem Soc. vol. 141, No. 11, Nov. 1994.

Eftekhari et al., "Effect of Na diffusion on the formation of fibrous microcrystals of manganese oxide," Materials Research Bulletin, 2005, 40:2205-2211.

Feng et al., "Hydrothermal Soft Chemical Synthesis of Tunnel Manganese Oxides with $Na^+$ as Template," Chemistry Letters, 2000:284-285.

Huang et al., "Kinetics of Electrode Processes of $LiFePO_4$ in Saturated Lithium Nitrate Solution," Acta Phys.-Chim. Sin., 2007, 23(1):129-133.

Imanishi et al., "Study of Electrochemical Sodium Deintercalation of a $Na_xFeO_2$," Denki Kagaku, 1993, 61 (12): 1451-1452.

PCT/US2009/039436, International Search Report & Written Opinion, Nov. 13, 2009, 8pgs; & International Preliminary Report on Patentability, Oct. 21, 2010, 5pgs.

Jin et al., "Hybrid supercapacitor based on MnO2 and columned FeOOH using $Li_2SO_4$ electrolyte solution," Journal of Power Sources, 2008, 175:686-691.

Jurewicz, K. et al., "Towards the Mechanism of Electrochemical Hydrogen Storage in Nanostructured Carbon Materials," Appl. Phys. A 78, 981-987 (2004).

Kanoh et al., "Electrochemical Intercalation of Alkali-Metal Ions into Birnessite-Type Manganese Oxide in Aqueous Solution," Langmuir, 1997, 13:6845-6849.

Kanoh et al., "Equilibrium Potentials of Spinel-Type Manganese Oxide in Aqueous Solutions," J. Electrochem. Soc., Nov. 1993, 140(11):3162-3166.

Kim et al., "Electrochemical properties of sodium/pyrite battery at room temperature," Journal of Power Sources, 2007, 174:1275-1278.

Kim et al., "Ionic conductivity of sodium ion with $NaCF_3SO_3$ salts in electrolyte for sodium batteries," Materials Science Forum, 2005, 486-487:638-641.

Komaba et al., "Enhanced Supercapacitive Behaviors of Birnessite Type Manganese Dioxide," Abstract from 214th ECS Meeting, Honolulu, HI, Oct. 12-17, 2008.

(56) References Cited

OTHER PUBLICATIONS

Li et al., "A study of nitroxide polyradical/activated carbon composite as the positive electrode material for electrochemical hybrid capacitor," Electrochimica Acta, 2007, 52:2153-2157.

Li et al., "Rechargeable Lithium Batteries with Aqueous Electrolytes," Science, May 20, 1994, 264:1115-1118.

Ma et al., "A novel concept of hybrid capacitor based on manganese oxide materials," Electrochemistry Communications, 2007, 9:2807-2811.

Mi et al., "Electrochemical behaviors of solid $LiFePO_4$ and $Li_{0.99}Nb_{0.01}FePO_4$ in $Li_2SO_4$ aqueous electrolyte," Journal of Electroanalytical Chemistry, 2007, 602:245-254.

Park et al., "A Study of Copper as a Cathode Material for an Ambient Temperature Sodium Ion Batter," Journal of the Electrochemical Society, 2001, 148(12):A1346-A1351.

Park et al., "Room-Temperature Solid-State Sodium/Sulfur Battery," Electrochemical and Solid-Satte Letters, 2006, 9(3):A123-A125.

Pitcher, Graham, "If the cap fits . . . How supercapacitors can help to solve power problems in portable products," New Electronics, Portable Products Special Report, www.neon.co.uk, Mar. 28, 2006, 25-26.

Renuka, "An Investigation on Layered Birnessite Type Manganese Oxides for Battery Applications," Journal of Power Sources, 2000, 78: 144-152.

Rydh et al., "Energy analysis of batteries in photovoltaic systems. Part I: Performance and energy requirements," Energy Conversion and Management, 2005, 46:1957-1979.

Rydh et al., "Energy analysis of batteries in photovoltaic systems. Part II: Performance and energy requirements," Energy Conversion and Management, 2005, 46:1980-2000.

Sauvage et al., "Study of the Insertion/Deinsertion Mechanism of Sodium into $Na_{0.44}MnO_2$," Inorganic Chemistry, 2007, 46:3289-3294.

Sauvage et al., "Study of the potentiometric response towards sodium ions of $Na_{0.44-x}MnO_2$ for the development of selective sodium ion sensors," Sensors and Actuators B, 2007, 120:638-644.

Spahr et al., "Electrochemical insertion of lithium, sodium, and magnesium in molybdenum(VI) oxide," Journal of Power Sources, 1995, 54:346-351.

Su et al., "Symmetric Self-Hybrid Supercapacitor Consisting of Multiwall Carbon Nanotubes and Co—Al Layered Double Hydroxides," Journal of the Electrochemical Society, 2008, 155(2):A110-A114.

Tani et al,. "Alkali Metal Ion-Selective Electrodes Based on Relevant Alkali Metal Ion Doped Manganese Oxides," Mikrochim. Acta 1998, 129:81-90.

Tevar et al., Cycling-Induced Crystallographic & Morphological Changes in Na4Mn9O18. 214th ECS Meeting, Abstract #642, The Electrochemical Society, Oct. 2008.

Toupin et al., "Charge Storage Mechanism of $MnO_2$ Electrode Used in Aqueous Electrochemical Capacitor," Chemistry of Materials, 2004, 16: 3184-3190.

Wang et al., "Improvement of cycle performance of lithium ion cell $LiMn_2O_4/Li_xV_2O_5$ with aqueous solution electrolyte by polypyrrole coating an anode," Electrochimica Acta, 2007, 52:5102-5107.

Wang et al., "A New Concept Hybrid Electrochemical Supercapacitor: Carbon/$LiMn_2O_4$ Aqueous System," Electrochemistry Communications, 2005, 7:1138-1142.

Whitacre et al., "Na4Mn9O18 as a Positive Electrode Material for an Aqueous Electrolyte Sodium-Ion Energy Storage Device," Electrochemistry Communications, 2010, 12:463-466.

Yang et al., "Interfacial synthesis of porous $MnO_2$ and its application in electrochemical capacitor," Electrochimica Acta, 2007, 53:752-757.

Zhuo et al., "The preparation of $NaV_{1-x}Cr_xPO_4F$ cathode materials or sodium-ion battery," Journal of Power Sources, 2006, 160:698-703.

Chinese Office Action for Chinese Application No. 201280039724.6, issued Aug. 5, 2014.

\* cited by examiner

HIGH VOLTAGE BATTERY COMPOSED OF ANODE LIMITED ELECTROCHEMICAL CELLS

FIELD

The present application is a continuation-in-part of U.S. application Ser. No. 13/186,226 filed on Jul. 19, 2011 and incorporated herein by reference in its entirety.

The present invention is directed to ensembles of electrochemical cells and in particular to hybrid energy storage devices.

BACKGROUND

Small renewable energy harvesting and power generation technologies (such as solar arrays, wind turbines, micro sterling engines, and solid oxide fuel cells) are proliferating, and there is a commensurate strong need for intermediate size secondary (rechargeable) energy storage capability. Energy storage batteries for these stationary applications typically store between 1 and 50 kWh of energy (depending on the application) and have historically been based on the lead-acid (Pb acid) chemistry. The batteries typically comprise a number of individual cells connected in series and parallel to obtain the desired system capacity and bus voltage.

For vehicular and stationary storage applications, it is not unusual to have batteries with bus voltages in the hundreds or thousands of volts, depending on application. In these cases, where many units are connected electrically in series, there is typically an inherent need for these cells to be as similar to each other as possible. In the event that the cells are not similar enough, a cell-level monitoring and controlling circuit is commonly necessary. If some set of cells in a string of cells have lower charge capacity than others in the same string, the lower capacity cells will reach an overcharge/undercharge condition during full discharge or charge of the string. These lower capacity cells will be de-stabilized (typically due to electrolyte corrosion reactions), resulting in diminished lifetime performance of the battery. This effect is common in many battery chemistries and is seen prominently in the Li-ion battery and in the supercapacitor pack. In these systems, costly and intricate cell-level management systems are needed if the cells are not produced to exacting (and expensive) precision.

SUMMARY

An embodiment relates to an electrochemical storage device including a plurality of electrochemical cells connected electrically in series. Each cell includes an anode (negative) electrode, a cathode (positive) electrode and an aqueous electrolyte. The charge storage capacity of the anode electrode is less than the charge storage capacity of the cathode.

Another embodiment relates to a method of operating an electrochemical energy storage device. The method includes charging a plurality of aqueous electrolyte electrochemical cells connected electrically in series. The water in the aqueous electrolyte electrolyzes to form hydrogen and $OH^-$ species at an anode electrode of at least one of the plurality of cells when a charge storage capacity of the anode electrode of the at least one cell is exceeded on charging the at least one cell.

DETAILED DESCRIPTION

It would be very useful to have batteries that can be built with cells that have a higher cell-to-cell charge storage capacity variation without sacrificing the integrity of the pack. The inventor has discovered an aqueous electrolyte electrochemical cell that is able to self-regulate using internal electrochemical reactions upon overcharge. This self-regulation allows for high voltage strings of cells to be manufactured with a high tolerance for cell-to-cell charge capacity variation. Preferably, but not necessarily, the system lacks a cell level voltage monitoring and current control circuit (also known as a cell-level battery management system, or BMS). Thus, the cell level voltage is not monitored or controlled.

Without being bound by any particular theory, the inventor believes that the mechanism of self-regulation is the local electrolysis of the aqueous electrolyte that takes place at the anode electrode. As electrolysis occurs, a small amount of hydrogen is generated along with $OH^-$ species. The $OH^-$ species locally increase the pH, thereby pushing the voltage stability window of electrolyte in the immediate vicinity of the anode to a lower value. This subsequently eliminates the continued evolution of hydrogen.

It is believed that at least a portion of the hydrogen species formed on charging of the cell is stored in, on and/or at the anode electrode of the cell during the period of overcharge. For brevity, the hydrogen species formed on charging of the cell and stored in, on and/or at the anode electrode will be referred to as "anode stored hydrogen" hereafter. It is believed that the hydrogen may be stored by being adsorbed (e.g., by van der Waals forces) and/or chemically bound (e.g., by covalent bonding) to the anode electrode surface and/or may be stored in the bulk of the activated carbon anode, for example by intercalation into the activated carbon lattice, adsorption to sidewalls of the activated carbon pores and/or by chemical bonding to the sidewalls of activated carbon pores. It is also possible that the hydrogen may be stored at the anode as a capacitive or pseudocapacitive double layer at (i.e., near) the anode surface. Preferably, a majority of the hydrogen species (e.g., at least 51%, such as 60-99%, including 70-90%) is stored in and/or at the anode electrode. Any remaining generated hydrogen species may evaporate from the cell as hydrogen gas.

If desired, any suitable hydrogen storage material may be added to the activated carbon anode material to increase the amount of anode stored hydrogen. Non-limiting examples of hydrogen storage materials include materials which chemically and/or physically store hydrogen, such as metal hydride materials (e.g., $MgH_2$, $NaAlH_4$, $LiAlH_4$, LiH, $LaNi_5H_6$, $TiFeH_2$, palladium hydride, etc.), metal hydroxide materials, (e.g., nickel hydroxide), metal boro-hydrides (e.g., $LiBH_4$, $NaBH_4$, etc.), nanostructured carbon (e.g., carbon nanotubes, buckyballs, buckypaper, carbon nanohorns, etc.), hollow glass microspheres, etc. The hydrogen storage material may be added only to the surface of the activated carbon anode and/or it may be added to the bulk of the anode by being mixed and pressed with the active carbon. The hydrogen storage material may be added to the anode electrode in a range of at least 0.1 mass %, such as 0.5 to 10 mass %, for example 1-2 mass % of the anode.

When the battery is allowed to discharge, it is believed that at least a portion of the anode stored hydrogen is released from the anode and is consumed/reacted (i.e., recombines) with local $OH^-$ to re-form water, or instead diffuses to the cathode side of the cell, where it can be similarly consumed. Preferably, a majority of the released anode stored hydrogen (e.g., at least 51%, such as 60-99%, including 70-90%) is reacted with local $OH^-$ to re-form water. Any remaining released anode stored hydrogen may evaporate from the cell as hydrogen gas.

The inventor has discovered that the use of an anode electrode of a material with a high overpotential for hydrogen evolution from water, such as carbon, combined with the local electrolysis and recombination of the aqueous electrolyte allows for an electrode environment that is highly tolerant to overcharge.

An embodiment of the invention includes an electrochemical storage device that includes cells electrically connected in series having a wider as-manufactured cell-to-cell variation in charge storage capacity than conventional charge storage devices. In this embodiment, cells with a lower charge storage capacity in the same string of cells charge to higher potentials during cycling. When this happens, the effect described above is believed to occur with no long-term detriment to the cell string.

In an embodiment, the electrochemical storage device is a hybrid electrochemical energy storage system in which the individual electrochemical cells include a pseudocapacitive or double-layer capacitor electrode (e.g., anode) coupled with an active electrode. In these systems, the capacitor electrode stores charge through a reversible nonfaradiac reaction of alkali (e.g., Li, Na, K, etc.) or Ca cations on the surface of the electrode (double-layer) and/or pseudocapacitance, while the active electrode undergoes a reversible faradic reaction in a transition metal oxide or a similar material that intercalates and deintercalates alkali or Ca cations similar to that of a battery.

An example of a Li-based system has been described by Wang, et al., which utilizes a spinel structure $LiMn_2O_4$ battery electrode, an activated carbon capacitor electrode, and an aqueous $Li_2SO_4$ electrolyte. Wang, et al., *Electrochemistry Communications*, 7:1138-42(2005). In this system, the negative anode electrode stores charge through a reversible non-faradaic reaction of Li-ion on the surface of an activated carbon electrode. The positive cathode electrode utilizes a reversible faradiac reaction of Li-ion intercalation/deintercalation in spinel $LiMn_2O_4$. A different system is disclosed in U.S. patent application Ser. No. 12/385,277, filed Apr. 3, 2009, hereby incorporated by reference in its entirety. In this system, the cathode electrode comprises a material having a formula $A_xM_yO_z$. A is one or more of Li, Na, K, Be, Mg, and Ca, x is within a range of 0 to 1 before use and within a range of 0 to 10 during use. M comprises any one or more transition metals, y is within a range of 1 to 3 and z is within a range of 2 to 7. The anode electrode comprises activated carbon and the electrolyte comprises $SO_4^{2-}$, $NO_3^-$, $ClO_4^-$, $PO_4^{3-}$, $CO_3^{2-}$, $Cl^-$, or $OH^-$ anions. Preferably, the cathode electrode comprises a doped or undoped cubic spinel $\lambda$-$MnO_2$-type material or a $NaMn_9O_{18}$ tunnel structured orthorhombic material, the anode electrode comprises activated carbon and the electrolyte comprises $Na_2SO_4$ solvated in water.

Figure 1:
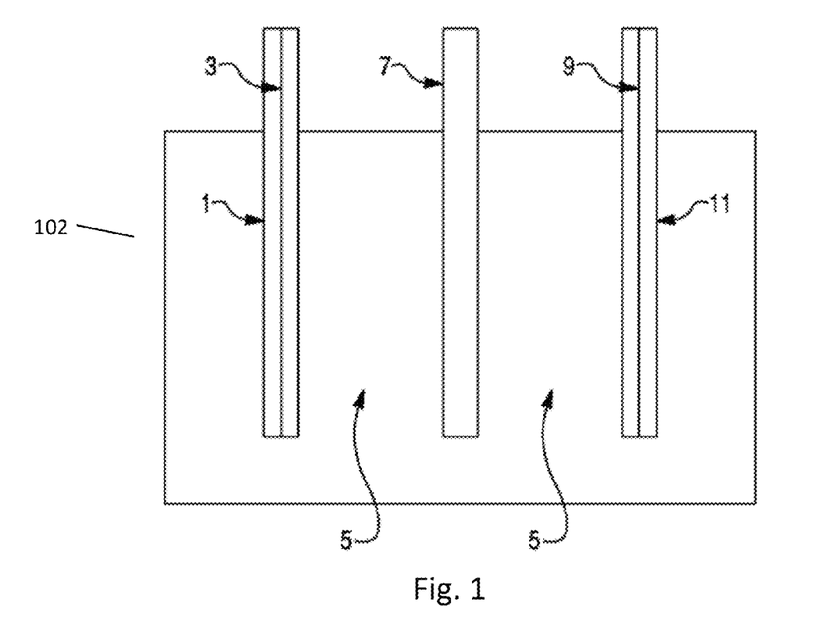
FIG. 1 illustrates an electrochemical cell according to an embodiment.

FIG. 1 is a schematic illustration of an exemplary electrochemical cell 102 according to an embodiment. The cell 102 includes a cathode side current collector 1 in contact with a cathode electrode 3. The cathode electrode 3 is in contact with an aqueous electrolyte solution 5, which is also in contact with an anode electrode 9. The cell 102 also includes a separator 7 located in the electrolyte solution 5 at a point between the cathode electrode 3 and the anode electrode 9. The anode electrode is also in contact with an anode side current collector 11. In FIG. 1, the components of the exemplary cell 102 are shown as not being in contact with each other. The cell 102 was illustrated this way to clearly indicate the presence of the electrolyte solution 5 relative to both electrodes. However, in actual embodiments, the cathode electrode 3 is in contact with the separator 7, which is in contact with the anode electrode 9.

In this embodiment, the cell 102 is "anode limited". That is, the charge storage capacity of the anode electrode 9 is less than that of the cathode electrode 3. The charge storage capacity of an electrode is the product of the mass of the electrode and the specific capacity (in units of Ah/kg) of the electrode material. Thus, in an anode limited cell, the mass of the active cathode material multiplied by the usable specific capacity of the cathode material is greater than the mass of the active anode material multiplied by the useable specific capacity of the anode material. Preferably, the storage capacity of the anode electrode 9 available before water begins electrolysis at the anode electrode/electrolyte interface is 50-90%, such as 75-90% of the charge storage capacity of the cathode electrode 3.

In a preferred embodiment, the cell is an unbalanced cell in which the product of the specific capacity of the anode and the load of the anode is less than the product of the specific capacity of the cathode and the load of the cathode. For example, the cathode product may be at least 20% greater, such as 50-500%, for example 100-200% greater than the anode product. Thus, the capacity (in the units of mAh) of the anode is lower (such as at least 50-500% lower) than that of the cathode.

The unbalanced cell causes the water to electrolyze at the anode and the generated hydrogen ions to become anode stored hydrogen, when the anode potential is below the electrolysis potential of water. This is not necessarily an "overcharge" condition because the battery may be designed to be operated at this low anode potential.

Preferably, the anode electrode 9 is made from a material that is corrosion resistant (resistant to the hydrogen formed by electrolysis) at the charging voltage as will be discussed below.

A method according to an embodiment includes charging the energy storage system 100 at a voltage 1.5 times greater and/or 0.8 volts higher than a voltage at which electrolysis of the water at the anode electrode of the cells is initiated, without inducing corrosion of the anode electrode material.

Figure 2:
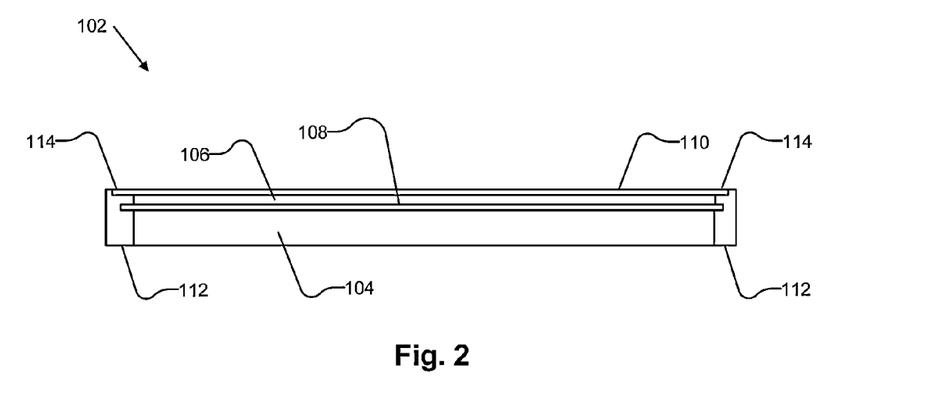
FIG. 2 is a schematic illustration of an electrochemical cell according to an embodiment of the invention. The electrochemical cell may be stacked in a bipolar or prismatic stack configuration.

FIG. 2 illustrates another embodiment of an electrochemical cell 102. The electrochemical cell 102 includes an anode electrode 104, a cathode electrode 106 and a separator 108 between the anode electrode 104 and the cathode electrode 106. The electrochemical cell 102 also includes an electrolyte located between the anode electrode 104 and the cathode electrode 106. In an embodiment, the separator 108 may be porous with electrolyte located in the pores. The electrochemical cell 102 may also include a graphite sheet 110 that acts as a current collector for the electrochemical cell 102. Preferably, the graphite sheet 110 is densified. In an embodiment, the density of the graphite sheet 110 is greater than 0.6 g/cm$^3$. The graphite sheet 110 may be made from, for example, exfoliated graphite. In an embodiment, the graphite sheet 110 may include one or more foil layers. Suitable materials for the anode electrode 104, the cathode electrode 106, the separator 108 and the electrolyte are discussed in more detail below.

The anode electrode 104, the cathode electrode 106, the separator 108 and the graphite sheet current collector 110 may be mounted in a frame 112 which seals each individual cell. The frame 112 is preferably made of an electrically insulating material, for example, an electrically insulating plastic or epoxy. The frame 112 may be made from preformed rings, poured epoxy or a combination of the two. In an embodiment, the frame 112 may comprise separate anode and cathode frames. In an embodiment, the graphite sheet current collector 110 may be configured to act as a seal 114 with the frame 112. That is, the graphite sheet current collector 110 may extend into a recess in the frame 112 to act as the seal 114. In this embodiment, the seal 114 prevents electrolyte from flowing from one electrochemical cell 102 to an adjacent electrochemical cell 102. In alternative embodiments, a separate seal 114, such as a washer or gasket, may be provided such that the graphite sheet current collector does not perform as a seal.

In an embodiment, the electrochemical cell is a hybrid electrochemical cell. That is, the cathode electrode 106 in operation reversibly intercalates alkali metal cations and the anode electrode 104 comprises a capacitive electrode which stores charge through either (1) a reversible nonfaradiac reaction of alkali metal cations on a surface of the anode electrode or (2) a pseudocapacitive electrode which undergoes a partial charge transfer surface interaction with alkali metal cations on a surface of the anode electrode.

Individual device components may be made of a variety of materials as follows.

Anode

The anode may, in general, comprise any material capable of reversibly storing Na-ions (and/or other alkali or alkali earth ions) through surface adsorption/desorption (via an electrochemical double layer reaction and/or a pseudocapacitive reaction (i.e. partial charge transfer surface interaction)) and be corrosion/hydrogen resistant in the desired voltage range. In an embodiment, the anodes are made of activated carbon (which is corrosion free; that is, not damaged by evolved hydrogen). Preferably, the anode electrode comprises high surface area (e.g., activated) carbon that has been modified to have more than 120 F/g (e.g., 120 to 180 F/g) in 1 M $Na_2SO_4$ under anodic biasing conditions. Preferably, the activated carbon anode is pseudocapacitive and is configured to operate in a voltage range of −1 to 0.8 volts SHE. Alternative anode materials include graphite, mesoporous carbon, carbon nanotubes, disordered carbon, Ti-oxide (such as titania) materials, V-oxide materials, phospho-olivine materials, other suitable mesoporous ceramic materials, and combinations thereof.

Optionally, the anode electrode may be in the form of a composite anode comprising activated carbon, a high surface area conductive diluent (such as conducting grade graphite, carbon blacks, such as acetylene black, non-reactive metals, and/or conductive polymers), a binder, such as PTFE, a PVC-based composite (including a $PVC-SiO_2$ composite), cellulose-based materials, PVDF, other non-reactive non-corroding polymer materials, or a combination thereof, plasticizer, and/or a filler. The composite anode electrode, as with a single material anode electrode, should be corrosion/hydrogen resistant in the desired voltage range. In an embodiment, the anode electrode comprises an alkali titanate compound that reversibly interacts with alkali or alkali earth ions via a pseudocapacitive or intercalative reaction mechanism, such as sodium or lithium titanate. The alkali titanate may be, for example, in the form of nanocrystals on the surface of the anode or intercalated into the anode.

Cathode

Any suitable material comprising a transition metal oxide, sulfide, phosphate, or fluoride can be used as active cathode materials capable of reversible alkali and/or alkali earth ion, such as Na-ion intercalation/deintercalation. Materials suitable for use as active cathode materials in embodiments of the present invention preferably contain alkali atoms, such as sodium, lithium, or both, prior to use as active cathode materials. It is not necessary for an active cathode material to contain Na and/or Li in the as-formed state (that is, prior to use in an energy storage device). However, for devices in which use a Na-based electrolyte, Na cations from the electrolyte should be able to incorporate into the active cathode material by intercalation during operation of the energy storage device. Thus, materials that may be used as cathodes in embodiments of the present invention comprise materials that do not necessarily contain Na or other alkali in an as-formed state, but are capable of reversible intercalation/deintercalation of Na or other alkali-ions during discharging/charging cycles of the energy storage device without a large overpotential loss.

In embodiments where the active cathode material contains alkali-atoms (preferably Na or Li) prior to use, some or all of these atoms are deintercalated during the first cell charging cycle. Alkali cations from a sodium based electrolyte (overwhelmingly Na cations) are re-intercalated during cell discharge. This is different than nearly all of the hybrid capacitor systems that call out an intercalation electrode opposite activated carbon. In most systems, cations from the electrolyte are adsorbed on the anode during a charging cycle. At the same time, the counter-anions, such as hydrogen ions, in the electrolyte intercalate into the active cathode material, thus preserving charge balance, but depleting ionic concentration, in the electrolyte solution. During discharge, cations are released from the anode and anions are released from the cathode, thus preserving charge balance, but increasing ionic concentration, in the electrolyte solution. This is a different operational mode from devices in embodiments of the present invention, where hydrogen ions or other anions are preferably not intercalated into the cathode active material and/or are not present in the device. The examples below illustrate cathode compositions suitable for Na intercalation. However, cathodes suitable for Li, K or alkali earth intercalation may also be used.

Suitable active cathode materials may have the following general formula during use: $A_xM_yO_z$, where A is Na or a mixture of Na and one or more of Li, K, Be, Mg, and Ca, where x is within the range of 0 to 1, inclusive, before use and within the range of 0 to 10, inclusive, during use; M comprises any one or more transition metal, where y is within the range of 1 to 3, inclusive; preferably within the range of 1.5 to 2.5, inclusive; and O is oxygen, where z is within the range of 2 to 7, inclusive; preferably within the range of 3.5 to 4.5, inclusive.

In some active cathode materials with the general formula $A_xM_yO_z$, Na-ions reversibly intercalate/deintercalate during the discharge/charge cycle of the energy storage device. Thus, the quantity x in the active cathode material formula changes while the device is in use.

In some active cathode materials with the general formula $A_xM_yO_z$, A comprises at least 50 at % of at least one or more of Na, K, Be, Mg, or Ca, optionally in combination with Li; M comprises any one or more transition metal; O is oxygen; x ranges from 3.5 to 4.5 before use and from 1 to 10 during use; y ranges from 8.5 to 9.5 and z ranges from 17.5 to 18.5. In these embodiments, A preferably comprises at least 51 at % Na, such as at least 75 at % Na, and 0 to 49 at %, such as 0 to 25 at %, Li, K, Be, Mg, or Ca; M comprises one or more of Mn, Ti, Fe, Co, Ni, Cu, V, or Sc; x is about 4 before use and ranges from 0 to 10 during use; y is about 9; and z is about 18.

In some active cathode materials with the general formula $A_xM_yO_z$, A comprises Na or a mix of at least 80 atomic percent Na and one or more of Li, K, Be, Mg, and Ca. In these embodiments, x is preferably about 1 before use and ranges from 0 to about 1.5 during use. In some preferred active cathode materials, M comprises one or more of Mn, Ti, Fe, Co, Ni, Cu, and V, and may be doped (less than 20 at %, such as 0.1 to 10 at %; for example, 3 to 6 at %) with one or more of Al, Mg, Ga, In, Cu, Zn, and Ni.

General classes of suitable active cathode materials include (but are not limited to) the layered/orthorhombic $NaMO_2$ (birnessite), the cubic spinel based manganate (e.g., $MO_2$, such as $\lambda$-$MnO_2$ based material where M is Mn, e.g., $Li_xM_2O_4$ (where $1 \leq x < 1.1$) before use and $Na_2Mn_2O_4$ in use), the $Na_2M_3O_7$ system, the $NaMPO_4$ system, the $NaM_2(PO_4)_3$ system, the $Na_2MPO_4F$ system, and the tunnel-structured orthorhombic $NaM_9O_{18}$, where M in all formulas comprises at least one transition metal. Typical transition metals may be Mn or Fe (for cost and environmental reasons), although Co, Ni, Cr, V, Ti, Cu, Zr, Nb, W, Mo (among others), or combinations thereof, may be used to wholly or partially replace Mn, Fe, or a combination thereof. In embodiments of the present invention, Mn is a preferred transition metal. In some embodiments, cathode electrodes may comprise multiple active cathode materials, either in a homogenous or near homogenous mixture or layered within the cathode electrode.

In some embodiments, the initial active cathode material comprises $NaMnO_2$ (birnassite structure) optionally doped with one or more metals, such as Li or Al.

In some embodiments, the initial active cathode material comprises $\lambda$-$MnO_2$ (i.e., the cubic isomorph of manganese oxide) based material, optionally doped with one or more metals, such as Li or Al.

In these embodiments, cubic spinel $\lambda$-$MnO_2$ may be formed by first forming a lithium containing manganese oxide, such as lithium manganate (e.g., cubic spinel $LiMn_2O_4$) or non-stoichiometric variants thereof. In embodiments which utilize a cubic spinel $\lambda$-$MnO_2$ active cathode material, most or all of the Li may be extracted electrochemically or chemically from the cubic spinel $LiMn_2O_4$ to form cubic spinel $\lambda$-$MnO_2$ type material (i.e., material which has a 1:2 Mn to O ratio, and/or in which the Mn may be substituted by another metal, and/or which also contains an alkali metal, and/or in which the Mn to O ratio is not exactly 1:2). This extraction may take place as part of the initial device charging cycle. In such instances, Li-ions are deintercalated from the as-formed cubic spinel $LiMn_2O_4$ during the first charging cycle. Upon discharge, Na-ions from the electrolyte intercalate into the cubic spinel $\lambda$-$MnO_2$. As such, the formula for the active cathode material during operation is $Na_yLi_xMn_2O_4$ (optionally doped with one or more additional metal as described above, preferably Al), with $0<x<1$, $0<y<1$, and $x+y \leq 1.1$. Preferably, the quantity x+y changes through the charge/discharge cycle from about 0 (fully charged) to about 1 (fully discharged). However, values above 1 during full discharge may be used. Furthermore, any other suitable formation method may be used. Non-stoichiometric $Li_xMn_2O_4$ materials with more than 1 Li for every 2 Mn and 40 atoms may be used as initial materials from which cubic spinel $\lambda$-$MnO_2$ may be formed (where $1 \leq x < 1.1$ for example). Thus, the cubic spinel $\lambda$-manganate may have a formula $Al_zLi_xMn_{2-z}O_4$ where $1 \leq x < 1.1$ and $0 \leq z < 0.1$ before use, and $Al_zLi_xNa_yMn_2O_4$ where $0 \leq x < 1.1$, $0 \leq x < 1$, $0 \leq x+y < 1.1$, and $0 \leq z < 0.1$ in use (and where Al may be substituted by another dopant).

In some embodiments, the initial cathode material comprises $Na_2Mn_3O_7$, optionally doped with one or more metals, such as Li or Al.

In some embodiments, the initial cathode material comprises $Na_2FePO_4F$, optionally doped with one or more metals, such as Li or Al.

In some embodiments, the cathode material comprises orthorhombic $NaM_9O_{18}$, optionally doped with one or more metals, such as Li or Al. This active cathode material may be made by thoroughly mixing $Na_2CO_3$ and $Mn_2O_3$ to proper molar ratios and firing, for example at about 800° C. The degree of Na content incorporated into this material during firing determines the oxidation state of the Mn and how it bonds with $O_2$ locally. This material has been demonstrated to cycle between $0.33 < x < 0.66$ for $Na_xMnO_2$ in a non-aqueous electrolyte. Alternatively, the cathode material comprises $LiMn_2O_4$ and the electrolyte comprises $Li_2SO_4$.

Optionally, the cathode electrode may be in the form of a composite cathode comprising one or more active cathode materials, a high surface area conductive diluent (such as conducting grade graphite, carbon blacks, such as acetylene black, non-reactive metals, and/or conductive polymers), a binder, a plasticizer, and/or a filler. Exemplary binders may comprise polytetrafluoroethylene (PTFE), a polyvinylchloride (PVC)-based composite (including a PVC-$SiO_2$ composite), cellulose-based materials, polyvinylidene fluoride (PVDF), hydrated birnassite (when the active cathode material comprises another material), other non-reactive non-corroding polymer materials, or a combination thereof. A composite cathode may be formed by mixing a portion of one or more preferred active cathode materials with a conductive diluent, and/or a polymeric binder, and pressing the mixture into a pellet. In some embodiments, a composite cathode electrode may be formed from a mixture of about 50 to 90 wt % active cathode material, with the remainder of the mixture comprising a combination of one or more of diluent, binder, plasticizer, and/or filler. For example, in some embodiments, a composite cathode electrode may be formed from about 80 wt % active cathode material, about 10 to 15 wt % diluent, such as carbon black, and about 5 to 10 wt % binder, such as PTFE.

One or more additional functional materials may optionally be added to a composite cathode to increase capacity and replace the polymeric binder. These optional materials include but are not limited to Zn, Pb, hydrated $NaMnO_2$ (birnassite), and $Na_4Mn_9O_{18}$ (orthorhombic tunnel structure). In instances where hydrated $NaMnO_2$ (birnassite) and/or hydrated $Na_{0.44}MnO_2$ (orthorhombic tunnel structure) is added to a composite cathode, the resulting device has a dual functional material composite cathode. A cathode electrode will generally have a thickness in the range of about 40 to 800 μm.

Current Collectors

In embodiments of the present invention, the cathode and anode materials may be mounted on current collectors. For optimal performance, current collectors are desirable that are electronically conductive and corrosion resistant in the electrolyte (aqueous Na-cation containing solutions, described below) at operational potentials.

For example, an anode current collector should be stable in a range of approximately −1.2 to −0.5 V vs. a standard $Hg/Hg_2SO_4$ reference electrode, since this is the nominal potential range that the anode half of the electrochemical cell is exposed during use. A cathode current collector should be stable in a range of approximately 0.1 to 0.7 V vs. a standard $Hg/Hg_2SO_4$ reference electrode.

Suitable uncoated current collector materials for the anode side include stainless steel, Ni, NiCr alloys, Al, Ti, Cu, Pb and Pb alloys, refractory metals, and noble metals.

Suitable uncoated current collector materials for the cathode side include stainless steel, Ni, NiCr alloys, Ti, Pb-oxides ($PbO_x$), and noble metals.

Current collectors may comprise solid foils or mesh materials.

Another approach is to coat a metal foil current collector of a suitable metal, such as Al, with a thin passivation layer that will not corrode and will protect the foil onto which it is deposited. Such corrosion resistant layers may be, but are not limited to, TiN, CrN, C, CN, NiZr, NiCr, Mo, Ti, Ta, Pt, Pd, Zr, W, FeN, CoN, etc. These coated current collectors may be used for the anode and/or cathode sides of a cell. In one embodiment, the cathode current collector comprises Al foil coated with TiN, FeN, C, or CN. The coating may be accomplished by any method known in the art, such as but not limited to physical vapor deposition such as sputtering, chemical vapor deposition, electrodeposition, spray deposition, or lamination.

Electrolyte

Embodiments of the present invention provide a secondary (rechargeable) energy storage system which uses a water-based (aqueous) electrolyte, such as an alkali based (e.g., Li and/or Na-based) or alkaline earth based aqueous electrolyte. Use of Na allows for use of much thicker electrodes, much less expensive separator and current collector materials, and benign and more environmentally friendly materials for electrodes and electrolyte salts. Additionally, energy storage systems of embodiments of the present invention can be assembled in an open-air environment, resulting in a significantly lower cost of production.

Electrolytes useful in embodiments of the present invention comprise a salt dissolved fully in water. For example, the electrolyte may comprise a 0.1 M to 10 M solution of at least one anion selected from the group consisting of $SO_4^{2-}$, $NO_3^-$, $ClO_4^-$, $PO_4^{3-}$, $CO_3^{2-}$, $Cl^-$, and/or $OH^-$. Thus, Na cation containing salts may include (but are not limited to) $Na_2SO_4$, $NaNO_3$, $NaClO_4$, $Na_3PO_4$, $Na_2CO_3$, NaCl, and NaOH, or a combination thereof.

In some embodiments, the electrolyte solution may be substantially free of Na. In these instances, cations in salts of the above listed anions may be an alkali other than Na (such as Li or K) or alkaline earth (such as Ca, or Mg) cation. Thus, alkali other than Na cation containing salts may include (but are not limited to) $Li_2SO_4$, $LiNO_3$, $LiClO_4$, $Li_3PO_4$, $Li_2CO_3$, LiCl, and LiOH, $K_2SO_4$, $KNO_3$, $KClO_4$, $K_3PO_4$, $K_2CO_3$, KCl, and KOH. Exemplary alkaline earth cation containing salts may include $CaSO_4$, $Ca(NO_3)_2$, $Ca(ClO_4)_2$, $CaCO_3$, and $Ca(OH)_2$, $MgSO_4$, $Mg(NO_3)_2$, $Mg(ClO_4)_2$, $MgCO_3$, and $Mg(OH)_2$. Electrolyte solutions substantially free of Na may be made from any combination of such salts. In other embodiments, the electrolyte solution may comprise a solution of a Na cation containing salt and one or more non-Na cation containing salt.

Molar concentrations preferably range from about 0.05 M to 3 M, such as about 0.1 to 1 M, at 100° C. for $Na_2SO_4$ in water depending on the desired performance characteristics of the energy storage device, and the degradation/performance limiting mechanisms associated with higher salt concentrations. Similar ranges are preferred for other salts.

A blend of different salts (such as a blend of a sodium containing salt with one or more of an alkali, alkaline earth, lanthanide, aluminum and zinc salt) may result in an optimized system. Such a blend may provide an electrolyte with sodium cations and one or more cations selected from the group consisting of alkali (such as Li or K), alkaline earth (such as Mg and Ca), lanthanide, aluminum, and zinc cations.

The pH of the electrolyte may be neutral (e.g., close to 7 at room temperature, such as 6.5 to 7.5). Optionally, the pH of the electrolyte may be altered by adding some additional OH—ionic species to make the electrolyte solution more basic, for example by adding NaOH other $OH^-$ containing salts, or by adding some other $OH^-$ concentration-affecting compound (such as $H_2SO_4$ to make the electrolyte solution more acidic). The pH of the electrolyte affects the range of voltage stability window (relative to a reference electrode) of the cell and also can have an effect on the stability and degradation of the active cathode material and may inhibit proton ($H^+$) intercalation, which may play a role in active cathode material capacity loss and cell degradation. In some cases, the pH can be increased to 11 to 13, thereby allowing different active cathode materials to be stable (than were stable at neutral pH 7). In some embodiments, the pH may be within the range of about 3 to 13, such as between about 3 and 6 or between about 8 and 13.

Optionally, the electrolyte solution contains an additive for mitigating degradation of the active cathode material, such as birnassite material. An exemplary additive may be, but is not limited to, $Na_2HPO_4$, in quantities sufficient to establish a concentration ranging from 0.1 mM to 100 mM.

Separator

A separator for use in embodiments of the present invention may comprise a woven or non-woven cotton sheet, PVC (polyvinyl chloride), PE (polyethylene), glass fiber or any other suitable material.

Figure 3:
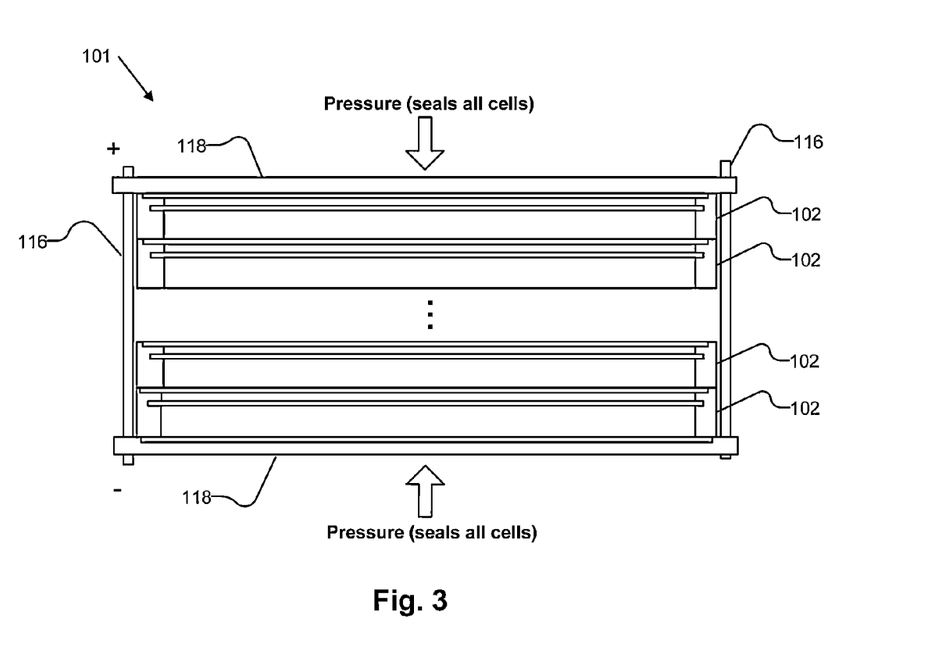
FIG. 3 is a schematic illustration of an electrochemical device comprising a bipolar stack of electrochemical cells according to an embodiment of the invention.

FIG. 3 illustrates embodiment of an electrochemical energy storage system 100. In this embodiment, the electrochemical energy storage system 100 comprises a bipolar stack 101 of electrochemical cells 102 according to another embodiment. In contrast to conventional stacks of electrochemical cells which include separate anode side and cathode side current collectors, in one embodiment, the bipolar stack 100B operates with a single graphite sheet current collector 110 located between the cathode electrode 106 of one electrochemical cell 102 and the anode electrode 104 of an adjacent electrochemical cell 102. Thus, bipolar stack 100B only uses half as many current collectors as the conventional stack of electrochemical cells.

In an embodiment, the bipolar stack 101 is enclosed in an outer housing 116 and provided with conducting headers 118 on the top and bottom of the bipolar stack 101. The headers 118 preferably comprise a corrosion resistant current collector metal, including but not limited to, aluminum, nickel, titanium and stainless steel. Preferably, pressure is applied to the bipolar stack 101 when assembled. The pressure aids in providing good seals to prevent leakage of electrolyte.

Figure 4A:
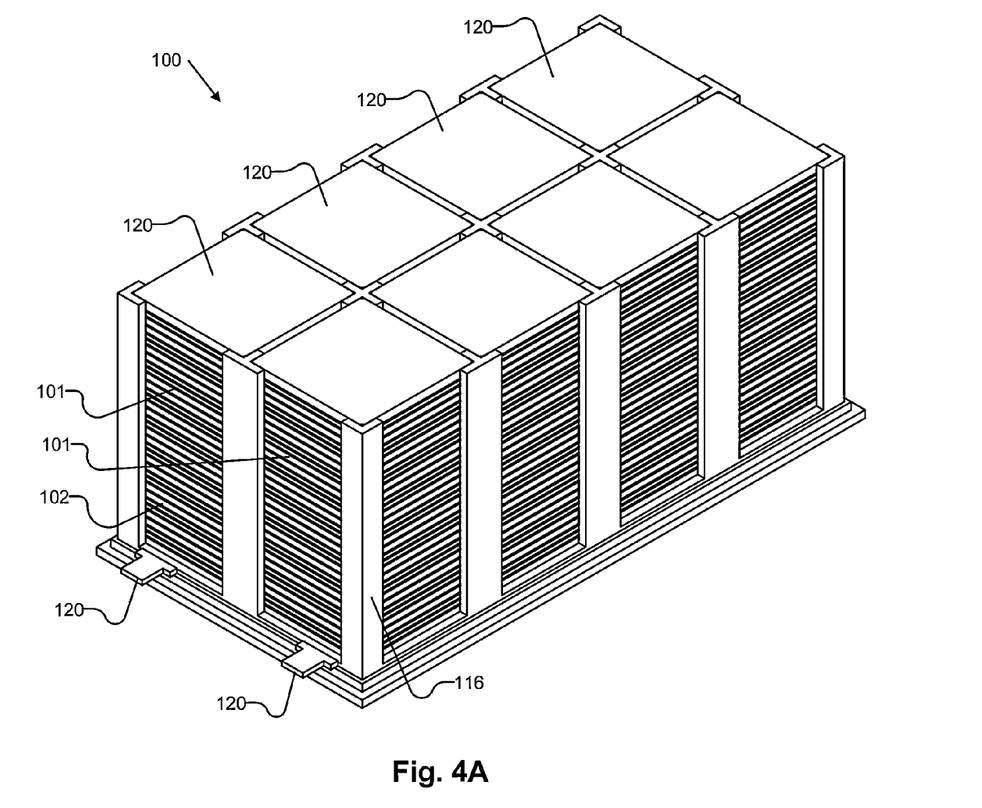
FIG. 4A illustrates an electrochemical energy storage system according to embodiment.

FIG. 4A illustrates an embodiment of an electrochemical energy storage system 100 according to an embodiment. The electrochemical energy storage system 100 includes a stack 101 of cells 102. The stack 101 of cells 102 may include 2, 4, 6, 8, or more cells 102. The stack 101 may then be enclosed in a housing 116. The top and bottom contacts 120 extend out of the housing 116 and provide a path for electricity to flow in and out of the cell 102.

In this embodiment, the electrochemical energy storage system 100 preferably includes multiple stacks 101 of cells 102. As illustrated, the electrochemical energy storage system 100 includes 8 stacks of cells 102, however, any number of stacks 101, such as 1, 2, 3, 4, 5, 6, 7, 8 or 10 may be fabricated. Larger electrochemical energy storage systems 100 having 20, 40, 50, 100 or 1000 stacks may also be fabricated. In an embodiment, all of the cells 102 in a stack 101 are connected in parallel while the stacks 101 are connected to each other in series. In other embodiments, one or more stacks 101 may be connected in parallel. In this manner, high voltages, such as hundreds or thousands of volts can be generated.

Figure 4B:
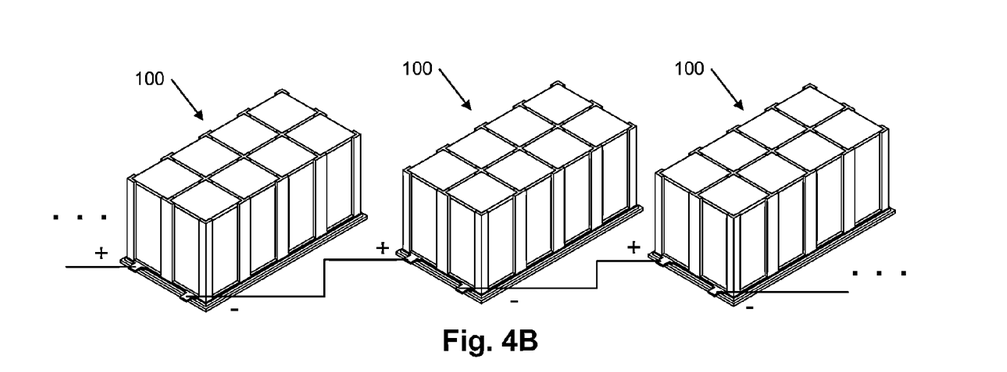
FIG. 4B illustrates an electrochemical energy storage system according to another embodiment.

FIG. 4B illustrates another embodiment of an electrochemical energy storage system 100. In this embodiment, two or more of the electrochemical energy storage systems 100 illustrated in FIG. 4A are connected in series. In this configuration, very large voltages may be conveniently generated. In an alternative embodiment, two or more of the electrochemical energy storage systems 100 illustrated in FIG. 4A are connected in parallel. In this configuration, large currents may be provided at a desired voltage.

Figure 5:
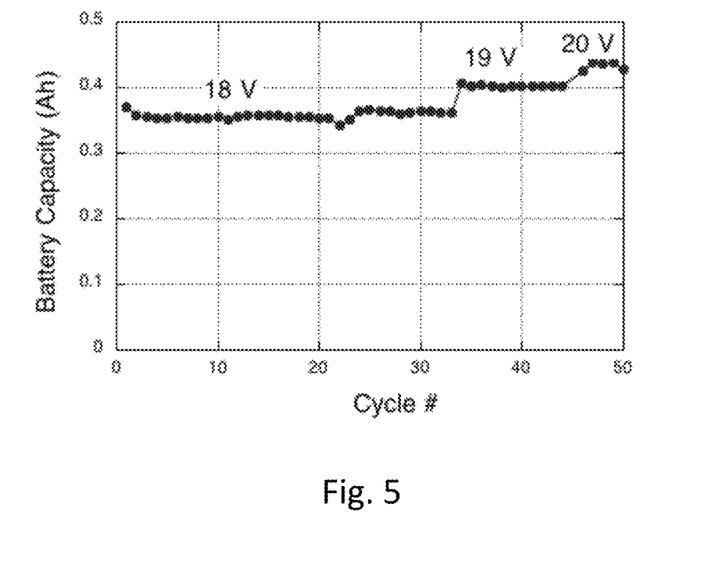
FIG. 5 is a plot of battery capacity as a function of charge/discharge cycles.

FIG. 5 shows data from a stack 101 of 10 cells 102 made with non-perfectly matched units cycled for many cycles. The cathode electrode 3 was made from $\lambda$-$MnO_2$ and the anode electrode 9 was made from activated carbon. These cells are designed for 0.6 to 1.8V/cell operation. The anode electrode 9 had a charge storage capacity that was 90% of the capacity of the cathode electrode 3. For the first 34 cycles, the stack 101 was charged at 18 volts (1.8 volts/cell). The stack 101 was then charged at 19 volts (1.9 V/cell) for 11 cycles followed by 20 volts (2.0V/cell) for 5 cycles. After 50 cycles, the data show that even though the aqueous cell voltage is higher than the expected stability window of water (1.23 V at 25 C), the stack 101 of cells 102 can be stably cycled. The data show no loss of function (no loss of capacity) through 50 cycles. This cannot be done for cells that are cathode limited (where the overpotential condition manifests at the cathode 3). This is because if the cell 102 was cathode limited, there would be oxygen evolving at the cathode 3 that would contribute to significant active material (metal oxide cathode) corrosion, leading to eventual failure of the cell 102.

Figure 6A:
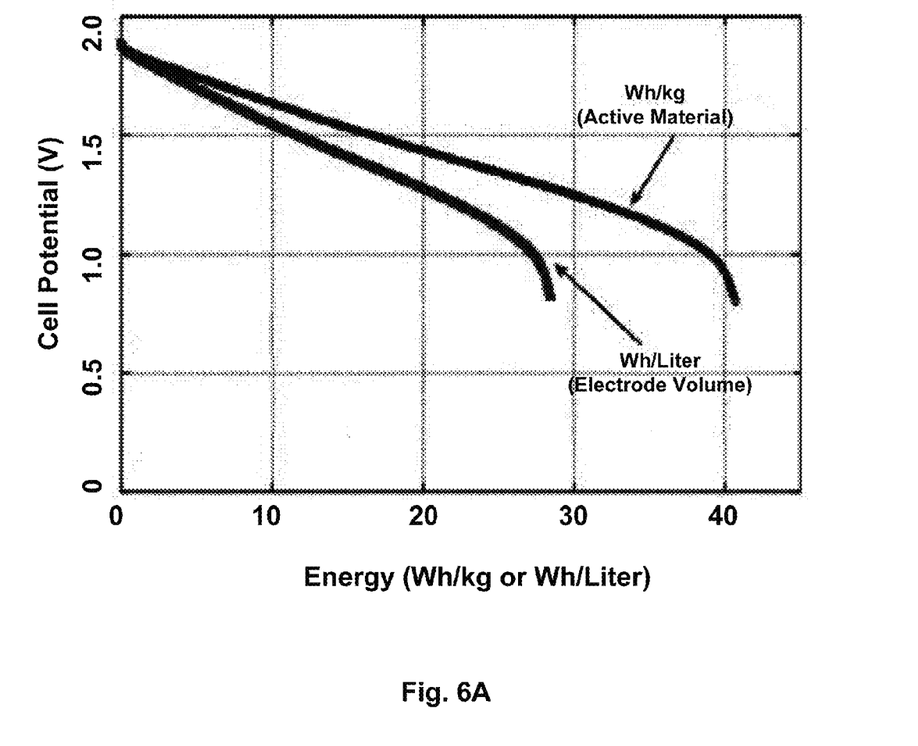
FIG. 6A is a plot of cell potential (in volts) versus energy (in units of Wh/kg of electrode active carbon material or in units of Wh/liter of anode electrode volume).
Figure 6B:
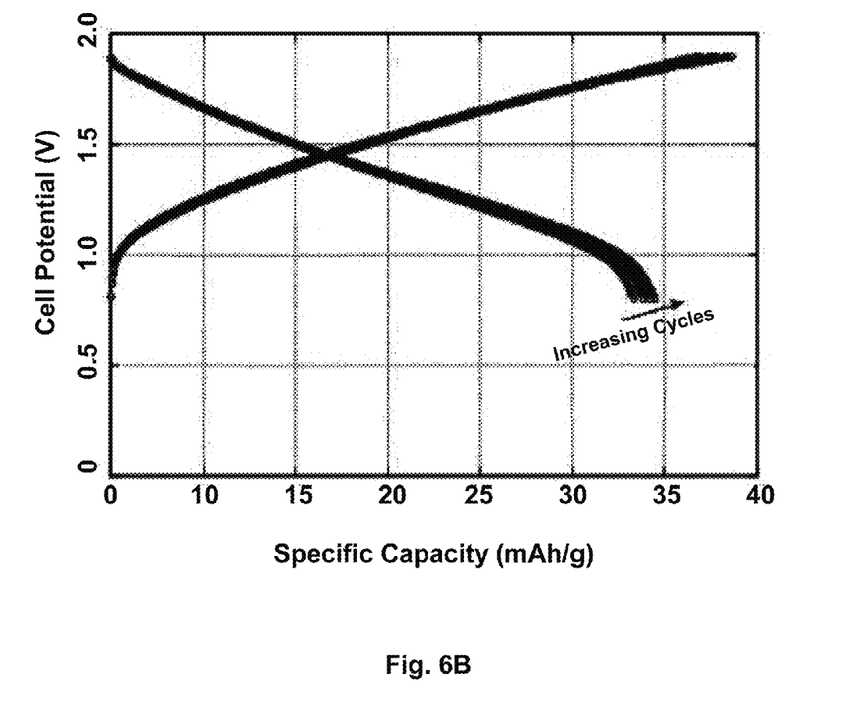
FIG. 6B is a plot of cell potential (in volts) versus specific capacity (in units of mAH/g).

FIGS. 6A and 6B are data plots from a non-limiting, exemplary device according to an embodiment of the invention which illustrate the effect of the anode to cathode mass ratio. In the exemplary cell, the anode active material (i.e., activated carbon) mass is 0.23 g and the cathode active material (i.e., metal oxide) mass is 0.66 g. The weight ratio of the anode to cathode mass is about 1 to 2.8 (i.e., less than 1). The cell dimension is 1.9 cm diameter, 0.35 cm thick anode, and 0.14 cm thick cathode.

As shown in FIG. 6A, this configuration provides over 40 Wh/kg in specific energy and nearly 30 Wh/l in energy density for the electrode stack volume in which packaging is not included. Furthermore, the data in FIG. 6B shows the good stability of the hybrid storage device. The capacity gets better as the device is cycled, which indicates that the electrode materials are not breaking down.

Figure 6C:
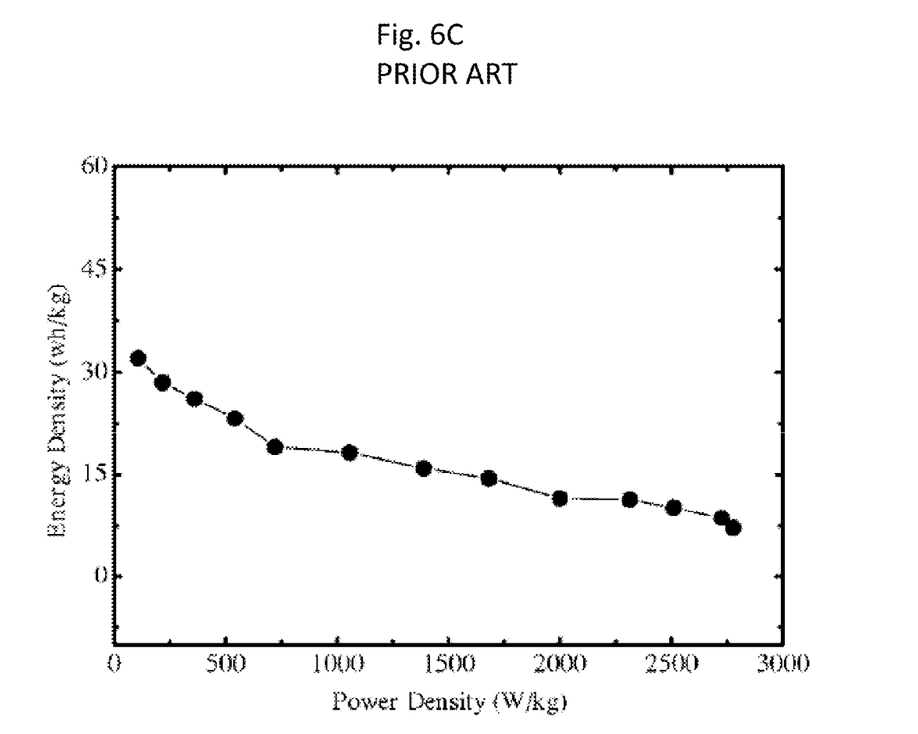
FIG. 6C is a Ragone plot of energy density versus power density for a prior art cell.

FIG. 6C illustrates a Ragone plot from a prior art device shown in FIG. 6 of an article by Wang et al., *Journal of The Electrochemical Society*, 153 (2) A450-A454 (2006), in which the best activated carbon anode to $LiMn_2O_4$ cathode mass ratio was 2:1. The best energy density of this prior art device was just over 30 Wh/kg at similar low rates. Thus, the exemplary device provides about 30% more energy (i.e., 40 vs. 30 Wh/kg) by using the anode stored hydrogen mechanism and an anode:cathode mass ratio of less than 1:1, such as less than 1:2, for example 1:2.5 to 1.4 (e.g., 1:2.8).

Figure 7A:
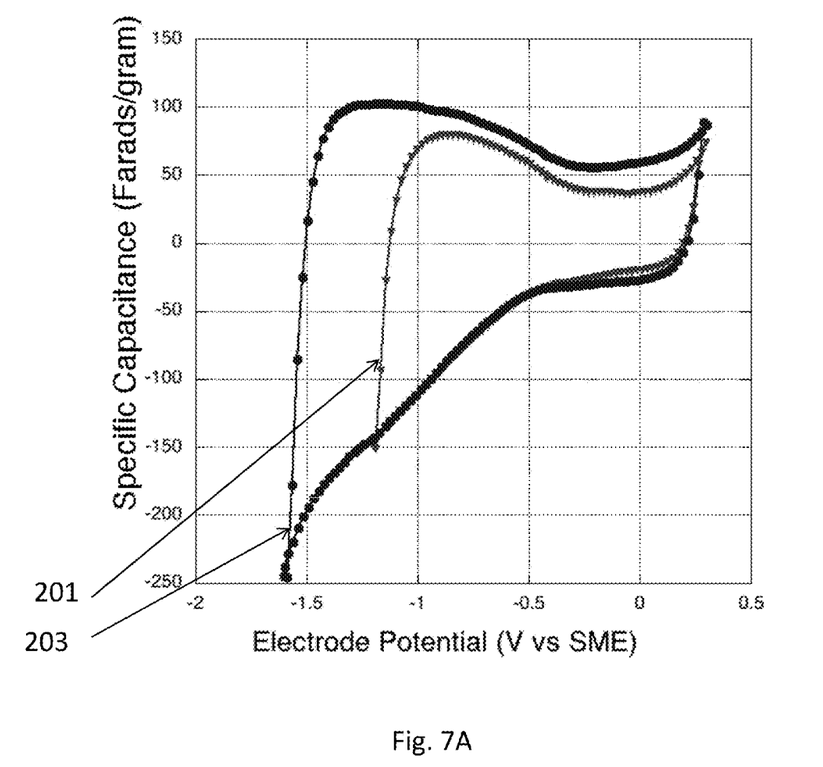
FIG. 7A is a plot of anode specific capacitance (in F/g) versus electrode potential (in units of volts versus SME) for an activated carbon anode.

FIG. 7A is a cyclic voltammogram that shows the increase in storage capacitance (in Farads/g) as a result of generating local hydrogen, storing it, and then releasing it. Specifically, plot 201 is a plot of activated carbon cycled to only –1.2 V vs. SME. This is a potential range where little to no hydrogen will be evolved, and the specific capacitance of plot 201 is lower than that for plot 203 which shows the behavior of the carbon when it is taken to –1.6 V vs. SME. In this potential range, hydrogen is evolved and the specific capacitance of the material is increased from a maximum of about 80 F/g to a maximum of over 100 F/g (on the positive or cathodic sweep). The added capacitance is attributed to the storage and subsequent consumption of hydrogen that is generated at the electrode under more extreme potentials. In this non-limiting example, the anode active material is activated carbon, then electrolyte is 1 M aqueous $Na_2SO_4$, the sweep rate is 5 mV/second, and the reference electrode is $Hg/Hg_2SO_4$ in sulfuric acid.

Figure 7B:
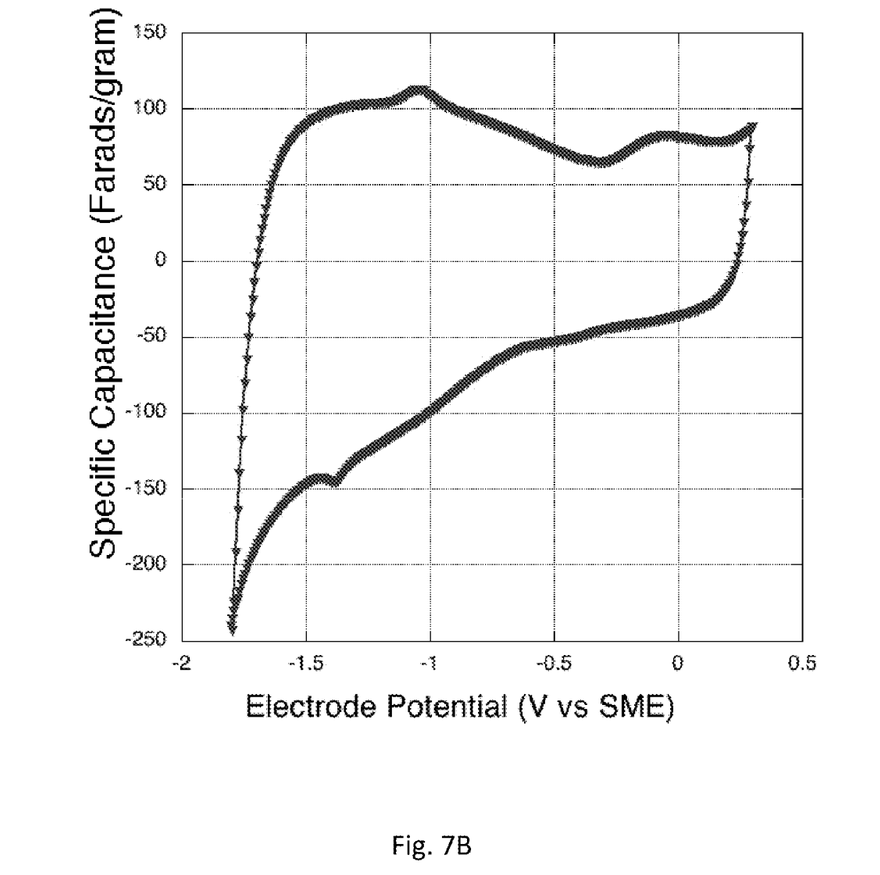
FIG. 7B is a plot of anode specific capacitance (in F/g) versus electrode potential (in units of volts versus SME) for an activated carbon anode with nickel hydroxide hydrogen storage material added to the anode surface.

FIG. 7B is a cyclic voltammogram similar to that in FIG. 7A, except that the anode includes activated carbon containing 1 mass percent nickel hydroxide (hydrogen storage material) added to the surface of the activated carbon. When this composite anode sample is tested under the same conditions described above with respect to FIG. 7A, good specific capacitance values are observed. Furthermore, distinct features on the plot are believed to be consistent with hydrogen storage mechanism associated with Ni—OH compounds. This is believed to be evidence that hydrogen is being evolved, stored and released at the expected potential ranges in this neutral pH solution of 1 M $Na_2SO_4$.

Thus, it is believed that FIGS. 7A and 7B serve as examples that show the anode stored hydrogen mechanism functioning in the same environment created in the hybrid device within the anode electrodes, such as during the above described overcharge condition. Furthermore, the anode stored hydrogen mechanism is more pronounced for long charge/discharge cycles (e.g., >1 hour cycles, such as 2-12 hour cycle). In contrast, this mechanism may not be observed in the quick "supercapacitor" type cycles (e.g., a few seconds to a few minutes) of prior art hybrid devices, such as the 200-920 second cycles of the Wang et al. article mentioned above.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. An electrochemical storage device comprising:
a plurality of hybrid electrochemical cells connected electrically in series, wherein each cell comprises:
a negative anode electrode;
a positive cathode electrode; and
an aqueous electrolyte, wherein a charge storage capacity of the anode electrode is less than a charge storage capacity of the cathode electrode;

wherein water in the electrolyte locally electrolyzes to form hydrogen and $OH^-$ species at the anode electrode of at least one of the plurality of hybrid electrochemical cells when the charge storage capacity of the anode electrode is exceeded on charging the at least one cell;

wherein the device is a hybrid energy storage device;

wherein the cathode electrode in operation reversibly intercalates alkali metal cations;

wherein the anode electrode comprises a capacitive electrode which stores charge through a reversible nonfaradiac reaction of alkali metal cations on a surface of the anode electrode or a pseudocapacitive electrode which undergoes a partial charge transfer surface interaction with alkali metal cations on a surface of the anode electrode;

wherein the storage capacity of the anode electrode available before water begins electrolysis at an anode electrode/electrolyte interface is 50-90% of the charge storage capacity of the cathode electrode;

wherein a mass ratio of the anode electrode to the cathode electrode is less than 1; and wherein a product of a specific capacity of the anode electrode and a load of the anode electrode is less than a product of a specific capacity of the cathode electrode and a load of the cathode electrode.

* * * * *